United States Patent
Peckol et al.

(10) Patent No.: US 10,286,372 B2
(45) Date of Patent: May 14, 2019

(54) SYSTEMS AND METHODS USING AN INSERT ASSEMBLY WITH STACKED GAS FLOW GAPS

(71) Applicant: Univation Technologies, LLC, Houston, TX (US)

(72) Inventors: William R. Peckol, Cross Lanes, WV (US); Donald A. Fischer, Cross Lanes, WV (US)

(73) Assignee: Univation Technologies, LLC, Houston, TX (US)

( * ) Notice: Subject to any disclaimer, the term of this patent is extended or adjusted under 35 U.S.C. 154(b) by 93 days.

(21) Appl. No.: 15/309,721

(22) PCT Filed: Mar. 10, 2015

(86) PCT No.: PCT/US2015/019572
§ 371 (c)(1),
(2) Date: Nov. 8, 2016

(87) PCT Pub. No.: WO2015/175083
PCT Pub. Date: Nov. 19, 2015

(65) Prior Publication Data
US 2017/0259235 A1  Sep. 14, 2017

Related U.S. Application Data

(60) Provisional application No. 61/991,744, filed on May 12, 2014.

(51) Int. Cl.
*B01J 8/00* (2006.01)
*C08F 6/00* (2006.01)

(52) U.S. Cl.
CPC .............. *B01J 8/0065* (2013.01); *C08F 6/005* (2013.01); *B01J 2219/00774* (2013.01)

(58) Field of Classification Search
None
See application file for complete search history.

(56) References Cited

U.S. PATENT DOCUMENTS

| | | | |
|---|---|---|---|
| 7,247,233 B1 | 7/2007 | Hedrick et al. |
| 7,749,466 B2 | 7/2010 | Vitucci et al. |
| 8,444,939 B2 | 5/2013 | Bowe et al. |
| 2005/0040075 A1 | 2/2005 | Cerqueira et al. |
| 2008/0253937 A1 | 10/2008 | Huziwara et al. |
| 2011/0219952 A1 | 9/2011 | Blickley et al. |

FOREIGN PATENT DOCUMENTS

EP  0172946  3/1986

OTHER PUBLICATIONS

International Search Report & Written Opinion for related PCT Application PCT/US2015/019572, dated Jun. 17, 2015 (10 pgs).

*Primary Examiner* — Catherine S Branch
(74) *Attorney, Agent, or Firm* — Brooks, Cameron & Huebsch, PLLC

(57) ABSTRACT

Disclosed are insert assemblies with stacked gas flow gaps to add and/or remove gases from a solid/gas mixture travelling through a barrier. An example system may comprise a barrier and an insert assembly in the barrier defining an annulus between the insert assembly and the barrier, wherein the insert assembly comprises stacked flow gaps configured for addition and/or removal of gas from a solid/gas mixture flowing in the annulus.

17 Claims, 5 Drawing Sheets

SYSTEMS AND METHODS USING AN INSERT ASSEMBLY WITH STACKED GAS FLOW GAPS

This application is a National Stage Application under 35 U.S.C. § 371 of International Application Number PCT/US2015/019572, filed Mar. 10, 2015 and published as WO 2015/175083 on Nov. 19, 2015 which claims the benefit to U.S. Provisional Application 61/991,744, filed May 12, 2014, the entire contents of which are incorporated herein by reference in its entirety.

FIELD

The invention generally relates to the addition and/or removal of gas from a solid/gas mixture flowing through a barrier. In particular, this disclosure relates to using an insert assembly in the barrier with stacked gas flow gaps to add and/or remove gases from a solid/gas mixture travelling through a vessel.

BACKGROUND

Usually, polyolefin polymerization processes make use of a purge bin after the reactor vessel to remove unwanted volatiles from the polymer resin. The purge bin is a vessel where a resin mixture enters the upper portion of the vessel and is subjected to purging gas through ports or openings at the bottom of the vessel and possibly along the sides and other areas of the vessel to remove the volatiles through a purging effect.

However, simply piping a purging gas into the resin without taking into account solids flow distribution, distribution of the purging gas through the resin, resin flow patterns, and any potential heating effect of the purging gas can result in damage to the resin and possibly lead to poor or non-commercially viable polymer products. In addition, the time that the resin is exposed to the purging gas may also affect the degree to which the volatiles are removed from the resin.

The interface between the resin and the purge bin along with any associated projections (such as pipes, tubes, supports, etc., that may protrude into the resin flow path) may also have an effect on the flow rate of the resin through the purge bin. Since volatiles may be purged from the resin at a rate dependent on the time of contact between the resin and the purge gas, any uneven flow pattern of the resin (i.e., slower or faster resin flow) can affect the amount of volatiles that are purged. Accordingly, the amount of volatiles removed differs from one portion of the purge bin to another dependent on the flow pattern of the resin.

Insert assemblies through which gas may be added and/or removed from the flow path of the resin are often included in the purge bin to address some of these problems with mass flow in the purge bin as well as gas distribution within the solids bed. One example of an insert assembly includes an inverted cone with one or more cylindrical member sections beneath the inverted cone whose purpose is to achieve a near constant velocity profile of the resin traveling downward in the purge bin. Other types of insert assembly may also be included in the purge bin. However, by inclusion of the insert assembly in the purge bin, the bin diameter may be undesirably increased thus increasing bin cost. This is because the diameter of the purge bin is a function of the area of the insert assembly. This relationship between bin diameter and insert area occurs because a maximum superficial velocity must not be exceeded without unacceptably high resin entrainment occurring in the case of removing gases from the solids bed. Entrainment of resin in the withdrawn gas may be undesirable for downstream equipment and may result in piping fouling. Moreover, when introducing gas into the bed of solids, it also is undesirable to locally fluidize the solids as this may result in gas maldistribution, an interruption of solids flow and segregation.

SUMMARY

Disclosed herein is an example system that comprises a barrier and an insert assembly in the barrier defining an annulus between the insert assembly and the barrier, wherein the insert assembly comprises stacked flow gaps configured for addition and/or removal of gas from a solid/gas mixture flowing in the annulus.

Disclosed herein is an example method for purging a solid/gas mixture. The method may comprise adding the solid/gas mixture to a barrier having an insert assembly therein, wherein the inset assembly comprises stacked flow gaps. The method may further comprise injecting a purge gas through the insert assembly and into the solid/gas mixture as the solid/gas mixture moves downward through the barrier. The method further may comprise removing a gas from the solid/gas mixture through the insert assembly as the solid/gas mixture moves downward through the barrier.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION

Figure 1:
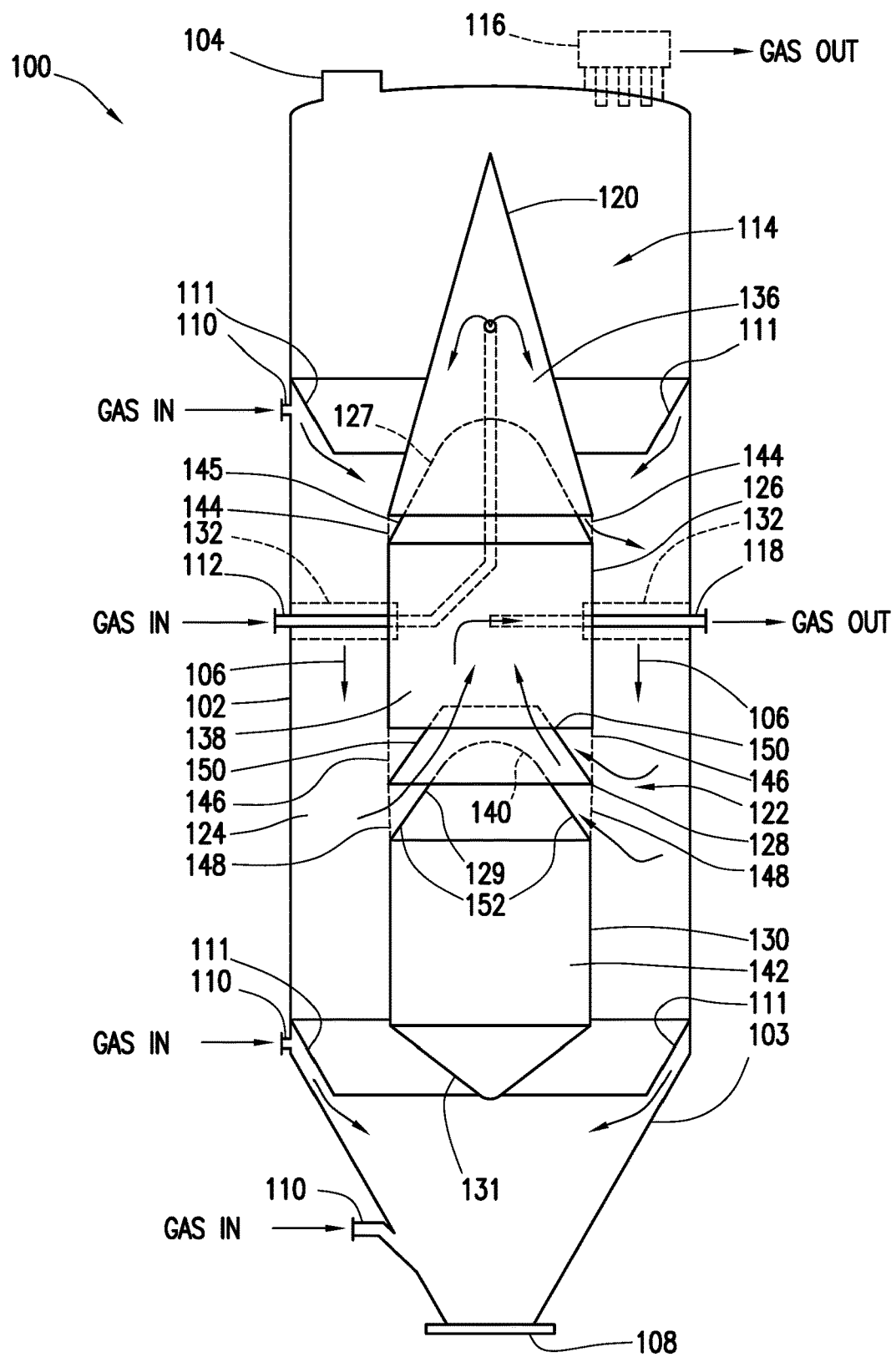
FIG. 1 is an exemplary cross-sectional diagram of a system for adding and/or removing gas from a solid/gas mixture.

Before the present compounds, components, compositions, devices, equipments, configurations, schematics, systems, and/or methods are disclosed and described, it is to be understood that unless otherwise indicated this invention is not limited to specific compounds, components, compositions, devices, equipments, configurations, schematics, systems, methods, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

Generally, embodiments disclosed herein relate to methods and systems of adding and/or removing gas from a purge bin. For example, embodiments disclosed herein relate to systems and methods for removing volatiles from a resin as it flows through a mass flow purge bin, which may be in a "plug flow" fashion.

Other general embodiments include methods for purging a gas from a solid/gas mixture where the solid/gas mixture flows through a purge bin, contacts an insert assembly comprising an inverted cone with a member under the cone. In some embodiments, the solid/gas mixture flowing through the purge bin may have a near constant velocity profile. The embodiments herein further include stacked flow gaps in the insert assembly for adding and/or removing gases from the solid/gas mixture. For example, a purge gas may be added to the solid/gas mixture through the stacked flow gaps.

The term "purge" as used herein refers to the process of removing unwanted dissolved and undissolved gases, including hydrocarbons and/or volatiles, from a solid granular polymer that has interstitial space filled with gas. In addition to the interstitial gas, hydrocarbons may be dissolved in the resin. The purging operation typically includes creation of a sufficient driving force to cause the absorbed hydrocarbon to diffuse from the resin. The hydrocarbons in the interstitial space are quickly displaced with purge gas, but the dissolved hydrocarbons are slow to come out, with the relative rate of diffusion dependent on the Molecular Weight (MW) of the hydrocarbon (large molecules diffuse out more slowly).

The term "volatiles" as used herein refers to a component or compound that has a low relative boiling point compared with the components or compounds around it. Illustrative volatiles include, but are not limited to, nitrogen, water, ammonia, methane, carbon dioxide, and all compounds of oxygen, carbon, and hydrogen.

The term "solid" as used herein refers to any solid material, such as resin, grain, metallic particles, etc. For example, a solid that is included in a solid/gas mixture may be a polymer resin that has been processed to a form which includes volatiles that are to be removed before the resin is stored or further processed.

The term "solid/gas mixture" as used herein refers to any substance including any solid, liquid, or gaseous substance, including any mixture thereof. For example, a solid/gas mixture might refer to a mixture of volatile gases, polymer resin, and purge gas, or in some instances, it may refer only to polymer resin and/or purge gas, etc.

The term "resin" as used herein refers to an intermediary or final material in the polymerization process. The resin may be a solid or a mixture of solids and interstitial gas or gases. For example, a resin may include any olefin monomer including substituted and unsubstituted alkenes having two to 10 carbon atoms, such as ethylene, propylene, 1-butene, 1-pentene, 1-hexene, 1-octene, 1-decene, 1-dodecene, styrene, and derivatives and mixtures thereof, along with other impurities such as volatiles, liquids, etc. Both unreacted monomers (alkenes) and non-reactive alkanes may be dissolved in the resin and both alkanes and alkenes may comprise parts of the interstitial gas. Illustrative nonreactive alkanes include, but are not limited to, propane, butane, isobutane, pentane, isopentane, hexane, isomers thereof and derivatives thereof.

The term "mass flow" as used herein refers to a unique flow condition where smooth surfaces and steep slopes of a vessel enable all the solids in the vessel to be in motion when solids are discharged from the vessel.

The term "plug flow" as used herein refers to a subset of mass flow where substantially all of a certain material, solid, gas, liquid, or combination thereof, in a vessel at a given point has about a uniform velocity profile. For example, in a vertically oriented purge bin, plug flow may be achieved when the solid/gas mixture in the purge bin at a given level is traveling vertically downward at substantially the same velocity. In another example, in a vertically oriented purge bin, plug flow may be achieved when the solid(s) in the solid/gas mixture is travelling vertically downward at about the same velocity at a given level in the purge bin.

The term "surface interface" as used herein refers to the area of contact between a gaseous environment and a solid or semi-solid material surface. For example, downstream from each gas injection point, there may be an area of solid/gas mixture where the injected gas interacts with a surface of the solid/gas mixture.

The term "constant velocity profile" as used herein refers to, for example, the solid(s) in a medium such as a solid/gas mixture at a given level preferably in a vertically oriented purge bin travelling downward (in a class of embodiments, vertically downward) in the purge bin at or about the same velocity. The term "constant vertical velocity profile" as used herein refers to, for example, the solid(s) in a medium such as a solid/gas mixture at a given level in a vertically oriented purge bin traveling vertically downward in the purge bin at or about the same velocity.

Now referring to FIG. 1, there is shown a system 100 for adding and/or removing gas from a solid/gas mixture in a barrier, which may be a bin, tube, pipe, etc., where the barrier may have any cross-sectional shape, such as a round, oval, polygonal, etc. For the sake of simplicity, and not limiting the invention in any way, the barrier has been depicted in FIGS. 1-3 as a purge bin 102, and all the descriptions accompanying the figures when referencing the barrier refer to a purge bin. However, the purge bin 102 and any type of barrier may be interchanged in the descriptions below without affecting the scope and breadth of the invention.

In the illustrated embodiment, the purge bin 102 includes an upper inlet 104 at or near the upper portion of the purge bin 102. A solid/gas mixture may enter the purge bin 102 through the upper inlet 104. As previously described, the solid/gas mixture, in some embodiments may include resin, which can include unwanted dissolved and undissolved gases. The solid/gas mixture may flow through the purge bin 102 in the direction indicated by arrows 106. As illustrated, the purge bin 102 may further include a lower discharge 108 at or near the lower portion of the purge bin 102. In the illustrated embodiment, the lower portion of the purge bin 102 may include a taper portion 103, which may be conical in shape, for example. The solid/gas mixture may exit the purge bin 102 through the lower discharge 108. While only the upper inlet 104 and lower discharge 108 are illustrated on FIG. 1, more than one inlet and outlet are possible, and several flows may be used in the purge bin 102, along with other approaches of handling flow of the solid/gas mixture.

The purge bin 102 may include gas inlets 110 through which a purge gas can be added to the solid/gas mixture. As illustrated, the gas inlets 110 may be located in the upper and lower portions of the purge bin 102. One or more of the gas inlets 110 may introduce the purge gas into the purge bin 102 through skirts 111 positioned on the interior walls of the purge bin 102 at the gas inlets 110. The angle of the skirts 111 may be sufficiently steep as to allow the solid/gas mixture to slide on the exterior surfaces of the skirts 111 and may promote solids mass flow. The skirts 111 may wrap completely around the surface circumference of the interior wall of the purge bin 102. In some embodiments, the skirts 111 may be segmented, and these segmented skirts may be placed on different locations relative to the longitudinal axis of the purge bin 102, or may be placed at the same position relative to the purge bin 102 longitudinal axis.

Each of the skirts 111 and/or purge bin 102 walls may include a friction-reducing coating on at least the exterior, solid/gas mixture contacting surfaces. Illustrative friction-reducing coatings include fluorpolymers such as polytetra-fluoroethylene (PTFE), fluorinated ethylene-propylene (FEP), PLASITE 7122 VTF, etc. Some of the preferred coatings are sold under the TEFLON® name brand, and may be obtained from DUPONT having a sales office in Wilmington, Del., USA.

The skirts 111 may be formed by having the adjacent upper portion of the purge bin 102 with a smaller internal diameter, and the adjacent lower portion of the purge bin 102 with a larger internal diameter, thereby defining a gap there between for transporting gas to or from the solid/gas mixture within the purge bin 102, as shown in FIG. 1.

The purge bin 102 may also include an insert gas inlet 112 through which the purge gas may be added to the solid/gas mixture by way of the insert assembly 114. The purge bin 102 may include a filter 116 through which gas may be removed from the purge bin 102. In some embodiments, a portion of the gas may flow out of the filter 116 and, in alternative embodiments, substantially all gas may flow out of the filter 116. However, gas may flow out of substantially any withdrawal point in the purge bin 102. For example, the purge bin 102 may include insert gas outlet 118 for withdrawing gas from the purge bin 102 through the insert assembly 114.

The purge bin 102 may include an insert assembly 114. As illustrated, the insert assembly 114 may comprise an inverted cone 120 and a member 122 under the inverted cone 120. As illustrated, an annular space 124 may be formed between the purge bin 102 and the insert assembly 114. The gas/flow mixture may flow down through the purge bin in the annular space 124. The member 122 under the inverted cone 120 may have dimensions that cause the solid/gas mixture passing there along to have about a constant velocity profile there across. The angle of the inverted cone 120 may be sufficiently steep as to allow the solid/gas mixture to slide on the exterior of the exterior surfaces of the inverted cone 120 and may promote solids mass flow. The top of the inverted cone 120 may be pointed, rounded, flat, or otherwise formed as desired for a particular application. In some embodiments, the insert assembly 114 may act to maintain near plug flow in the annular space 124. The inverted cone 120 and/or member 122 may have any cross-sectional shape, such as a round, oval, polygonal, etc. Moreover, the inverted cone 120 and/or member 122 may have a pointed tip, rounded tip, square tip, etc. In some embodiments, the inverted cone 120 may have steep angles and smooth surfaces such that mass flow is promoted in the purge bin 102. The insert assembly 114 may promote solids mass flow around the exterior surfaces thereof by having smooth surfaces.

The member 122 may be comprised of any number of member sections, such as member sections 126, 128, 130, which may be included below the inverted cone 120. The arrangement, design, and selection of each of the member sections 126, 128, 130, included with the inverted cone 120, if any, is a decision that depends on the desired effect of the insert assembly 114 as a whole, and the number of and distribution of gas inlet and withdrawal points. One or more member sections 126, 128, 130 may be used in any insert assembly 114, depending on several factors including length of the purge bin 102, flow velocity of the solid/gas mixture, gas flow rate, etc. These member sections 126, 128, 130 are referred to herein as uppermost member section 126, middle member section 128, and lowermost member section 130. As illustrated, the inverted cone 120 may be a separate piece from the uppermost member section 126. The inverted cone 120 may also be part of the uppermost member section 126, e.g., may be the upper end of the uppermost member section 126. In addition, the annular space 124 may be part of the purge bin 102, like an extension, or it may be an independent part.

The uppermost member section 126 may have a generally consistent diameter, for example, the uppermost member section 126 may be generally cylindrical in shape. However, other suitable shapes with a generally consistent cross-sectional area may be suitable. In the illustrated embodiment, the uppermost member section 126 includes a tapered portion 127 at its upper end. As illustrated, this tapered portion 127 may extend into the bottom portion of the inverted cone 120. The uppermost member section 126 may also be configured to add or remove gas from the surface interface of the solid/gas mixture. In the illustrated embodiment, the uppermost member section 126 includes insert gas outlet 118 for withdrawal of gas.

The middle member section 128 may be disposed at least partially between the uppermost member section 126 and the lowest member section 130. While not illustrated, additional member section may also be disposed between the uppermost member section 126 and the lowest member section 130 whether above or below the middle member section 128. In the illustrated embodiment, the middle member section 128 extends into the bottom of the uppermost member section 126. As illustrated, the middle member section 128 may be tapered from bottom to top. The middle member section 128 may also be conical in shape with a top that is rounded, pointed, flat, or otherwise formed. However, other shapes that taper from bottom to top may also be suitable for use. Additionally, only a portion of the middle member section 128 may be conical in shape wherein a portion of the middle member section 128 may have a generally consistent cross-sectional area. The middle member section 128 may be configured to add or remove gas from the surface interface of the solid/gas mixture. In the illustrated embodiment, the middle member section 128 is in communication with the uppermost member section 126 for withdrawal of gas.

The lowest member section 130 may be disposed at least partially beneath the middle member section 128. The lowest member section 130 may have a generally consistent diameter, for example, the lowest member section 130 may be generally cylindrical in shape. However, other shapes with a generally consistent cross-sectional area may be suitable. In the illustrated embodiment, the lowest member section 130 includes an upper tapered portion 129 at its upper end. As illustrated, this upper tapered portion 129 may extend into the bottom portion of the middle member section 128. The lowest member section 130 may also include a lower tapered portion 131 at its lower end, thus promoting more uniform solid/gas mixture flow across the external surfaces of the member 122. The lowest member section 128 may be configured to add or remove gas from the surface interface of the solid/gas mixture. Additionally, the lowest member section 130 may not be configured to add or remove gas from the surface interface of the solid/gas mixture. As illustrated, the lowest member section 130 may not be in communication with either the insert gas inlet 112 or the insert gas outlet 118.

One or more supports 132 may be provided from the purge bin 102 wall to the insert assembly 114 to hold it in place. As illustrated, the supports 132 may also provide passage ways in or under the insert assembly 114 to add or remove gas. The supports 114 may further provide an area for the insert gas inlet 112 and insert gas outlet 118, which may include associated equipment such as pipes, conduits, etc., for supplying fluid communication to the insert assembly 114, to provide or remove gas from insert assembly 114, such as by housing the associated equipment, providing support for the equipment, holding the equipment, etc. One or more of the insert gas inlet 112 and/or insert gas outlet 118 may also be connected to the insert assembly 114 independently of one or more of the supports 132. All or some supports, conduits, pipes, etc., that pass through the flow area, including supports 132, may have a flow enhancing top edge, such as a knife edge, to minimize flow disruption. For the sake of simplicity, each of the insert gas inlet 112 and the insert gas outlet 118 is also included with a support 132 in FIGS. 1-3, but this in no way limits the orientation, placement, and selection of the supports 132, insert gas inlet 112, and/or insert gas outlet 118 that can be used in any embodiments.

An outer diameter of the member 122 may be from about 75% to about 100% of an outer diameter of the inverted cone 120. Thus, the inverted cone 120 may have the same outside diameter as the member 122, resulting in an insert assembly 114 having a substantially consistent outside diameter. The outer diameter of the member 122 may be from about 75% to about 90%, or from about 80% to about 90% of the outer diameter of the inverted cone 120. The outer diameter of the member 122 may be from about 80% to about 100%, or from about 90% to about 100% of the outer diameter of the inverted cone 120. Preferably, the outer diameters referenced herein are measured at the points farthest apart of the referenced part, but may also refer to a median or average outer diameter thereof.

Additionally, an outer diameter of the member 122 may be from about 50% to about 95% of an inner diameter of a portion of the purge bin 102 adjacent thereto. An outer diameter of the inverted cone 120 and/or member 122 may be from about 50% to about 95% of an inner diameter of a portion of the purge bin 102 adjacent thereto. The outer diameter of the inverted cone 120 and/or member 122 may be from about 50% to about 80%, or from about 55% to about 75%, or from about 60% to about 70%, of the inner diameter of a portion of the purge bin 102 adjacent thereto. The outer diameter of the inverted cone 120 and/or member 122 may be from about 60% to about 95%, or from about 70% to about 85%, of the inner diameter of a portion of the purge bin 102 adjacent thereto. Thus, there may be a relationship between the outer diameter of the member 122 and/or of the inverted cone 120 and the inner diameter of the purge bin 102.

The inverted cone 120 and member sections 126, 128, and 130 may have internal chambers, such as chambers 136, 138, 140, and 142. Each of the chambers 136, 138, 140, and 142 may or may not be in fluid communication with adjacent ones of the chambers 136, 138, 140, and 142. By way of example, the inverted cone 120 and member sections 126, 128, and 130 may individually have upper openings and/or lower openings to allow fluid flow between the chambers 136, 138, 140, and 142. The openings may be in the form, for example, of a pipe, tube, passage, or other opening to allow fluid communication between the various components of the insert assembly 114. Embodiments of the uppermost member section 126 may not include an opening in its upper portion so chamber 136 of the inverted cone 120 is not in fluid communication with chamber 138 of the uppermost member section 126. Embodiments of the middle member section 128 may have an opening in its upper portion so the chamber 140 in the middle member section 128 may be in fluid communication with the chamber 138 of the uppermost member section 126. Embodiments of the lowest member section 130 may not have openings on either the upper or lower end so that the chamber 142 may not be in fluid communication with the chamber 140 of the middle member section 128 or with the purge bin 120.

Embodiments may include addition of purge gas to the flow of the solid/gas mixture in the purge bin 102 from the insert assembly 114. As previously described, the purge gas may also be added to the solid/gas mixture flow through gas inlets 110 in the exterior wall of the purge bin 102. In some embodiments, the purge gas may be supplied to the insert assembly 114 by insert gas inlet 112 in the purge bin 102. As illustrated, the insert gas inlet 112 may transport purge gas to an area directly below the inverted cone 120. In particular embodiments, the insert gas inlet 112 may transport purge gas to the chamber 136 in the inverted cone 120. Because there is no communication between the uppermost member section 126 and the inverted cone 120, the purge gas supplied into the inverted cone 120 does not flow into the uppermost member section 126. While only a insert gas inlet 112 is shown additional inlets and conduits may be included to supply purge gas to different portions of the insert assembly 114, such as the member 122, such that gas inlet flow to the insert assembly 114 may be individually controlled for each inlet and/or for each of the member section 126, 128, and 130 and/or the inverted cone 120.

The insert assembly 114 may include gaps, such as gas supply gap 144, in its exterior wall that allow purge gas to flow from the inert assembly 114 into the solid/gas mixture flow. As illustrated, the gas supply gap 144 may be formed between the inverted cone 120 and the uppermost member section 126. The gas supply gap 144 may wrap completely around the surface circumference of the exterior wall of the insert assembly 114. Additionally, the gas supply gap 144 may be segmented. Purge gas introduced into the chamber 136 in the inverted cone 120 may flow through the gas supply gap 144 and into solid/gas mixture flow in the purge bin 102. While only a single gas supply gap 144 for purge gas addition is illustrated on FIG. 1, embodiments may include multiple gaps in the insert assembly 114 for addition of purge gas to the solid/gas mixture flow.

The gas supply gap 144 may add gas to the solid/gas mixture in the annulus 124 through a supply skirt 145 extending inwardly from the member 122. For example, the supply skirt 145 may wrap the uppermost member section 126, as shown in FIG. 1. The supply skirt 145 may be segmented, and the segmented skirt may be placed on different locations relative to the longitudinal axis of the member 122 or may be placed at the same position relative to the member 122 longitudinal axis. In the illustrated embodiment, supply skirt 145 may be formed by the uppermost member section 126. As illustrated, the tapered portion 127 of the uppermost member section 126 may extend into the inverted cone 120 forming the supply skirt 145. To form the supply skirt 145, the adjacent portion of the tapered portion 127 forming the first inward skirt 150 may have a smaller diameter than the adjacent portion of the inverted cone 120.

Embodiments may include removal of gas from the flow of the solid/gas mixture in the purge bin 102. Gas may be removed from the flow of the solid/gas mixture through the insert assembly 114 and/or or through the filter 116. As previously described, a portion of the gas may flow out of the filter 116.

The insert assembly 114 may include gaps, such as first and second gas withdrawal gaps 146, 148, in its exterior wall that allow gas to be removed from the flow of the solid/gas mixture. As will be appreciated, the withdrawn gas may include purge gas as well as gas that is purged from the solid/gas mixture. By way of example, gas from the solid/gas mixture may pass through the first and second gas withdrawal gaps 146, 148 and flow into the insert assembly 114. The first and second gas withdrawal gaps 146, 148 may wrap completely around the surface circumference of the exterior wall of the insert assembly 114. The first and second gas withdrawal gaps 146, 148 may be segmented. As illustrated, the first gas withdrawal gap 146 may be formed between the uppermost member section 126 and the middle member section 128. A portion of the gas from the solid/gas mixture may flow through the first gas withdrawal gap 146 into chamber 138 in the uppermost member section 126. As illustrated, the second gas withdrawal gap 148 may be formed between the middle member section 128 and the lowest member section 142. A portion of the gas from the solid/gas mixture may flow through the second gas withdrawal gap 148 and into chamber 140 in the middle member section 128. In some embodiments, the chamber 140 is in fluid communication with the chamber 138 in the uppermost member section 126 so the gas will flow from the chamber 140 and into the chamber 138. While only two are illustrated on FIG. 1, embodiments may include more than two gaps in the insert assembly 114 for removal of gas from the solid/gas mixture flow.

Embodiments of the gaps (e.g., gaps 144, 146, 148) in the insert assembly 114 may be stacked. The gaps are considered stacked where they are arranged one on top of another so that gas flowing through the gaps is considered to add gas to, or remove gas from the same portion of the solid/gas mixture flow, as if only a single gap was used. As previously mentioned, the gaps are positioned in the insert assembly 114 for addition/removal of gas from the solid/gas mixture flow in the annulus 124. Gas supply gap 144 may positioned in the insert assembly 114 for addition of gas to the solid/gas mixture flow. First and second withdrawal gaps 146, 148 may be positioned in the insert assembly 114 for removal of gas from the solid/gas mixture flow. In the illustrated embodiment, the first and second gas withdrawal gaps 146, 148 are stacked. The first and second gas withdrawal gaps 146, 148 are considered stacked because they are positioned one on top of another with little to no vertical spacing so that they will ultimately function as a single gap for gas removal. To function as a single gap, the vertical spacing of stacked gaps, such as the first and second gas withdrawal gaps 146, 148, should be minimal. By way of example, stacked gaps should have a vertical spacing of about 12 inches or less, alternatively, about 6 inches or less, and alternatively about 1 inch or less.

The purge bin 102 may include insert gas outlet 118 for withdrawing gas from the insert assembly 114. As illustrated, gas removed from the solid/gas mixture and into the insert assembly 114 may be removed by flow through the insert gas outlet 118. In the illustrated embodiment, the gas may be removed from the chamber 138 in the uppermost member section 126 by flow through the insert gas outlet 118. While only a single gas outlet from the insert assembly 114 is shown, embodiments may include multiple gas outlets for removal of the gas from the insert assembly 114, such that gas withdrawal flow may be individually controlled for each gas outlet.

Each of the first and second gas withdrawal gaps 146, 148 may remove gas from the solid/gas mixture in the annulus 124 through skirts extending inwardly from the member 122. For example, skirts, such as first inward skirt 150 and second inward skirt 152, may wrap around one or more of the member sections, such as middle member section 128 and lowermost member section 130, as shown in FIG. 1. The first and second inward skirts 150, 152 may be segmented, and these segmented skirts may be placed on different locations relative to the longitudinal axis of the member 122 or may be placed at the same position relative to the member 122 longitudinal axis. The first and second inward skirts 150, 152 may have an almost uniform profile extending inwardly from the outer wall of the member 122.

In the illustrated embodiment, first inward skirt 150 may be formed by the middle member section 128. As illustrated, the middle member section 128 may be tapered and extend into the uppermost member section 126 forming the first inward skirt 150. To form the first inward skirt 150, the adjacent portion of the middle member section 128 forming the first inward skirt 150 may be tapered and have a smaller diameter than the adjacent portion of the uppermost member section 126.

In the illustrated embodiment, the second inward skirt 152 may be formed by the lower member section 130. As illustrated, the upper tapered portion 129 of the lower member section 130 extends into the middle member section 128 forming the second inward skirt 152. To form the second inward skirt 152, the adjacent portion of the upper tapered portion 129 may have a smaller diameter than the adjacent portion of the middle member section 128.

The gaps (e.g., gas supply gap 144, first gas withdrawal gap 146, second gas withdrawal gap 148) in the insert assembly 114 provide an area for gas to be added or removed from the solid/gas mixture flowing in the purge bin 102. The gaps may provide a surface interface between the solid/gas mixture and the added/removed gas. Each of the inverted cone 120 and skirts, such as supply skirt 127, first inward skirt 150, and second inward skirt 152 may include an angle of repose that determines the area of this surface interface, as will be explained in more detail below with respect to FIG. 5. This area of the surface interface may also be defined by the angle of the skirts and the width of the first and second gas withdrawal gaps 146, 148.

One of the many potential benefits of these embodiments is that the insert assembly 114 may promote solids mass flow in the purge bin 102. The insert assembly 114 may promote solids mass flow while the solid/gas mixture maintains a mass flow pattern wherein the solids flow may approach plug flow in the gas injection and removal sections.

Another potential benefit of these embodiments may be that use of gaps, such as gas supply gap 144, first gas withdrawal gap 146, and second gas withdrawal gap 148, in the insert assembly 114 instead of outward pointing skirts that extend into the annulus 124 may help to achieve a more uniform velocity profile, potentially even approaching a substantially constant velocity profile. Moreover, removal of outward pointing skirts can also eliminate potential accumulations points for the solid/gas mixture while flowing downward in the annulus 124. In addition, the surge bin 102 may also be made narrow without use of outwardly extending skirts because the width of the surge bin 102 will not need to accommodate such skirts.

Yet another potential benefit of these embodiments may be that use of stacked gaps, such as first gas withdrawal gap 146 and second gas withdrawal gap 148 stacked on top of one another, may provide a greater surface interface between the solid/gas mixture and the added/removed gas. Without stacking, this interface area is limited and is typically increased by increasing diameter of the insert assembly 114 as the height of the gaps in the insert assembly 114 cannot be made too large without undesirable axial flow. In addition, with stacking, an upper gas velocity at this interface may be set based on the design and arrangement of the insert assembly 114. By setting the upper gas velocity, solids entrainment due to high gas velocities may be reduced. Moreover, stacking permits adjusting of the diameter of the insert assembly 114 by varying the number and size of the gaps, which can result in reduction in insert diameter, which in turn can result in reduced bin size with resulting cost savings.

Figure 2:
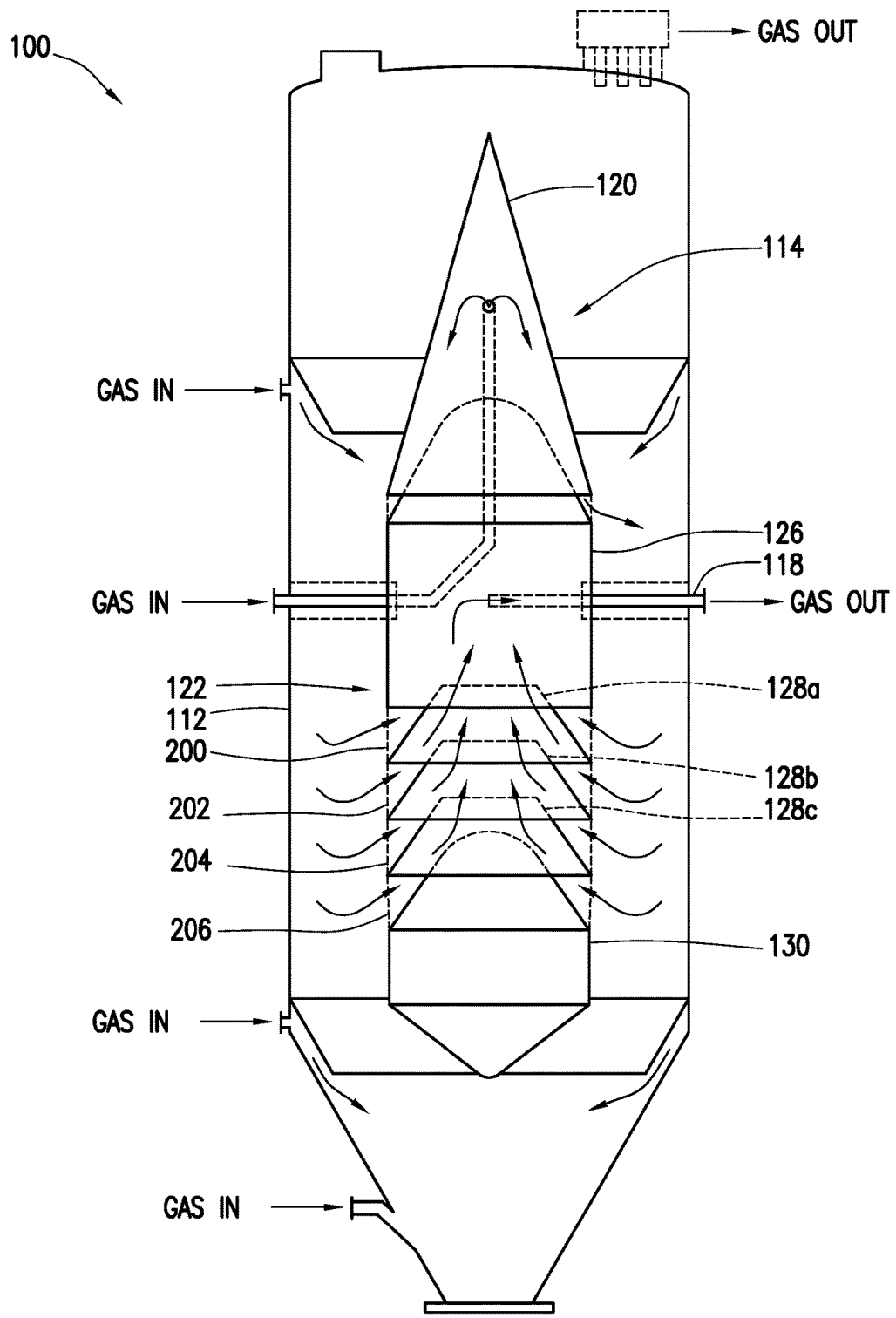
FIG. 2 is an exemplary cross-sectional diagram of a system for adding and/or removing gas from a solid/gas mixture.

Referring now to FIG. 2, the system 100 is illustrated in accordance with another embodiment. All of the previous definitions may apply to this description of FIG. 2, such as a barrier being described as a purge bin 102. With continued reference to FIG. 2, the system 100 may be used for adding and/or removing gas from a solid/gas mixture in a purge bin 102. As illustrated, the system 100 may comprise an insert assembly 114 disposed in the purge bin 102. Any of the other embodiments described herein may apply in the context of the design of the insert assembly 114 of FIG. 2. In some embodiments, the insert assembly 114 may comprise an inverted cone 120 and a member 122 under the inverted cone 120. In the illustrated embodiment, the member 122 may comprise uppermost member section 126 and lowest member section 130. The member section between the uppermost member section 126 and the lowest member section 130 has been divided into first, second and third middle member sections 128a, 128b, 128c.

In the illustrated embodiment, the insert assembly 114 may include multiple stacked gas withdrawal gaps stacked on top of one another, such as first gas withdrawal gap 200, second gas withdrawal gap 202, third gas withdrawal gap 204, and fourth gas withdrawal gap 206. The first gas withdrawal gap 200 may be defined between the uppermost member section 126 and the first middle member section 128a. The second gas withdrawal gap 202 may be defined between the first middle member section 128a and the second middle member section 128b. The third gas withdrawal gap 204 may be defined between the second middle member section 128b and the third middle member section 128c. A fourth gas withdrawal gap 206 may be defined between the third middle member section 128 and the lowest member section 130. As illustrated, the insert gas outlet 118 may be a common withdrawal point for gas removed from the solid/gas mixture via the gas withdrawal gaps, 200, 202, 204, 206.

Figure 3:
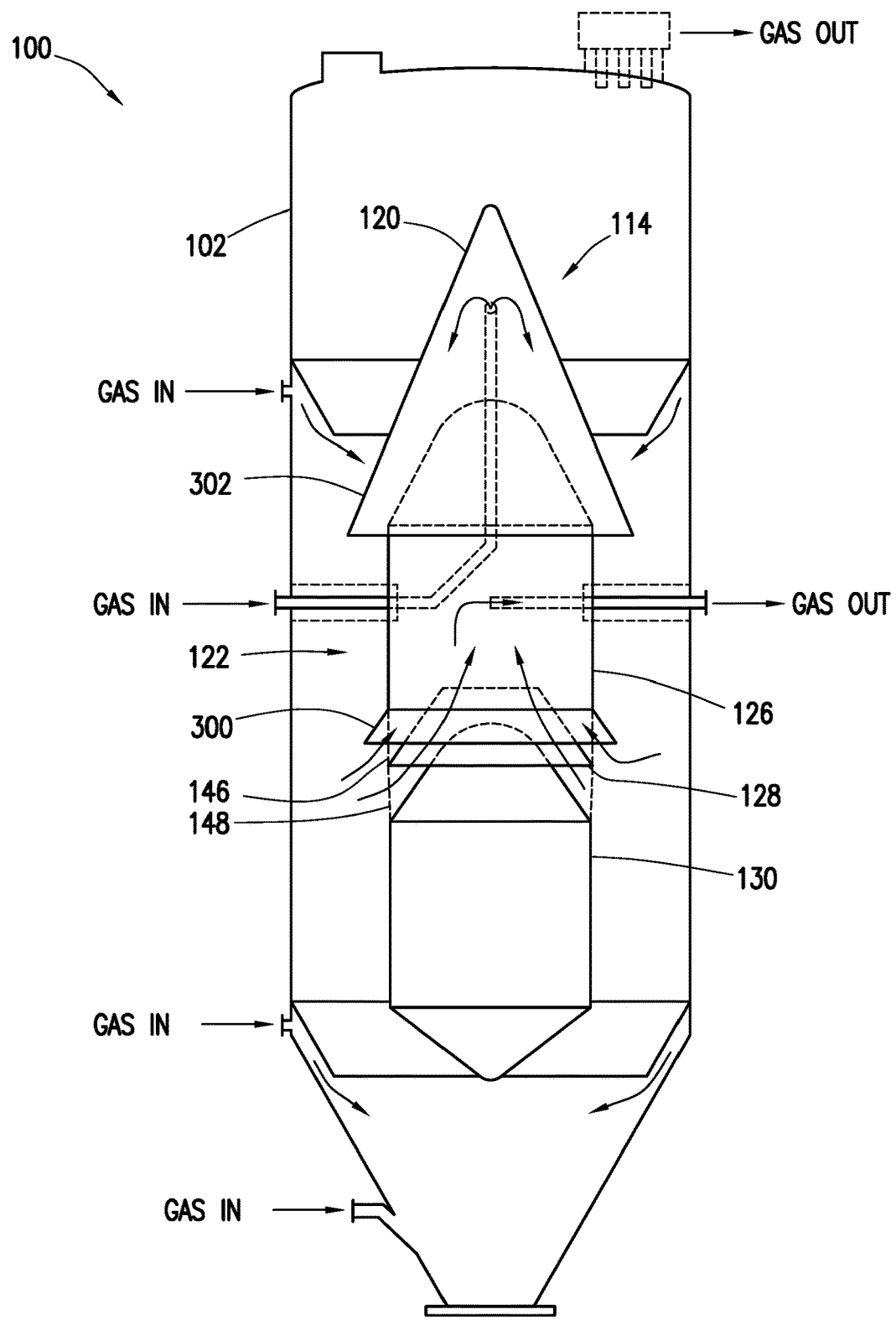
FIG. 3 is an exemplary cross-sectional diagram of a system for adding and/or removing gas from a solid/gas mixture.

Referring now to FIG. 3, the system 100 is illustrated in accordance with another embodiment that includes a skirt 300 that extends outwardly from the member 122. All of the previous definitions may apply to this description of FIG. 3, such as a barrier being described as a purge bin 102. With continued reference to FIG. 3, the system 100 may be used for adding and/or removing gas from a solid/gas mixture in a purge bin 102. As illustrated, the system 100 may comprise an insert assembly 114 disposed in the purge bin 210. Any of the other embodiments described herein may apply in the context of the design of the insert assembly 114 of FIG. 3. The insert assembly 114 may comprise an inverted cone 120 and a member 122 under the inverted cone 120. In the illustrated embodiment, the member 122 may comprise an uppermost member section 126, a middle member section 128, and a lowest member section 130. As illustrated, the bottom portion of the inverted cone 120 may be in the form of a cone skirt 302, in that the bottom portion may have a larger diameter than the adjacent upper portion of the uppermost member section 126.

As illustrated, the member 122 may have a skirt 300 that extends outwardly from the member 122. The skirt 300 may wrap around one or more of the member sections, such as uppermost member section 126, as shown on FIG. 3. The skirt 300 may be segmented, and these segmented skirts may be placed on different locations relative to the longitudinal axis of the member 300. In the illustrated embodiment, the skirt 300 is formed by having the adjacent uppermost member section 126 with a larger internal diameter than the adjacent upper portion of the middle member section 128, thereby forming first gas withdrawal gap 146 in the member 122. As illustrated, second gas withdrawal gap 148 may be formed in the member 122 between the middle member section 128 and the lowest member section 130.

The skirt 300 may include a friction-reducing coating on at least the exterior, solid/gas mixture contacting surfaces. Illustrative friction-reducing coatings include fluoropolymers such as polytetrafluoroethylene (PTFE), fluorinated ethylene-propylene (FEP), PLASITE 7122 VTF, etc. Some of the preferred coatings are sold under the TEFLON® name brand, and may be obtained from DUPONT having a sales office in Wilmington, Del., USA.

Figure 4:
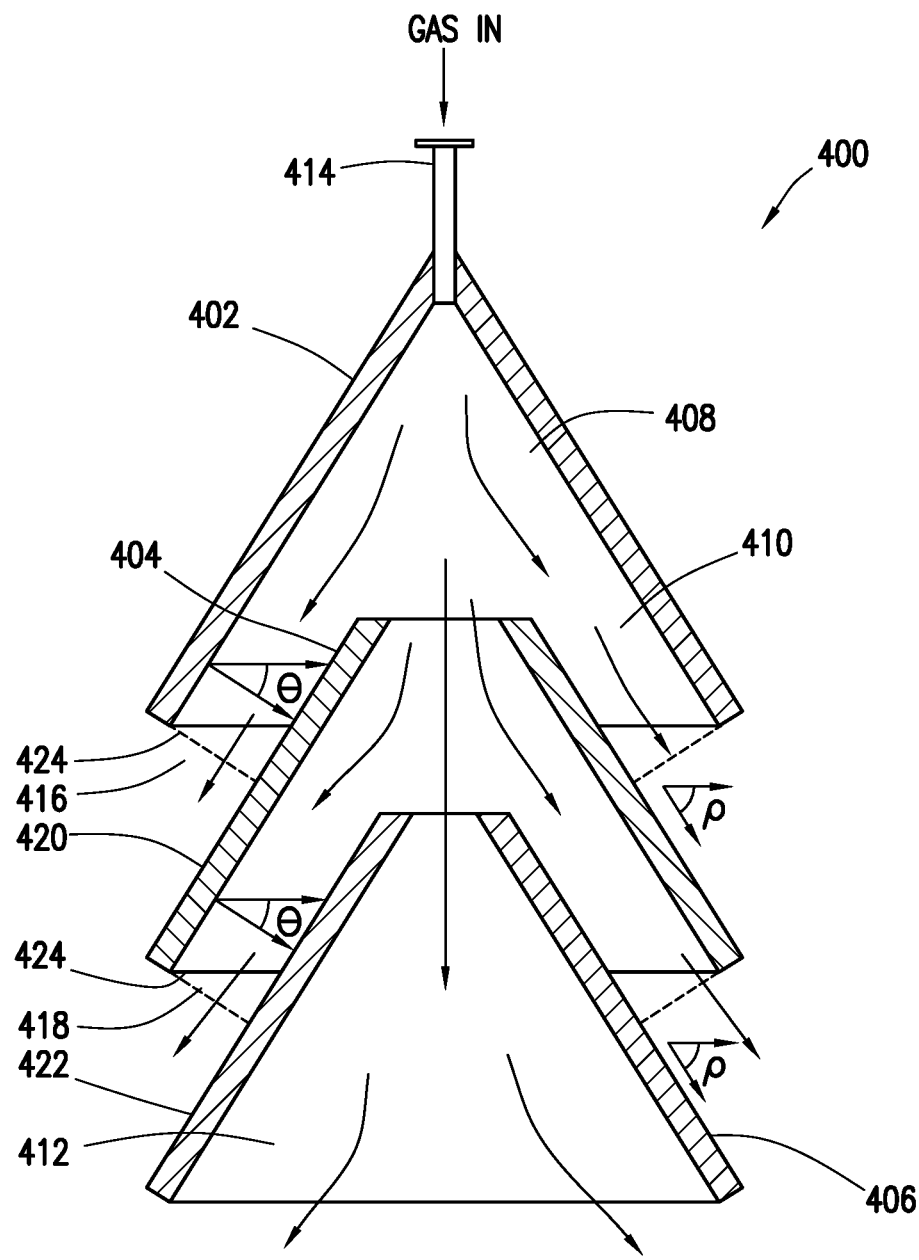
FIG. 4 is an exemplary cross-sectional diagram of an insert assembly for adding and/or removing gas from a solid/gas mixture in a purge bin.

With reference now to FIG. 4, another embodiment of an insert assembly 400 is shown in the form of a cone assembly which may be used for adding and/or removing gas from a solid/gas mixture. The insert assembly 400 may be used as a barrier, such as a surge bin 102 (FIGS. 1-3) for adding and/or removing gas from the solid/gas mixture. In the illustrated embodiment, the insert assembly 400 comprises a series of stacked inverted cones, such as uppermost inverted cone 402, middle inverted cone 404, and lowest inverted cone 406. The middle inverted cone 404 may extend into the bottom of the uppermost inverted cone 402, and the lowest inverted cone 406 may extend into the bottom of the lowest inverted cone 406.

The uppermost inverted cone 402, middle inverted cone 404, and lowest inverted cone 406 may have internal chambers, such as chambers 408, 410, 412. Each of the chambers 408, 410, 412 may or may not be in fluid communication with adjacent ones of the chambers 408, 410, 412. By way of example, opening may be formed in the upper end of the inverted cone 402, middle inverted cone 404, and lowest inverted cone 406 to allow fluid flow between the chambers 408, 410, 412. Embodiments of the middle inverted cone 404 may have an opening in its upper portion so the chamber 410 in the middle inverted cone 404 may be in fluid communication with the chamber 408 of the uppermost inverted cone 402.

Embodiments may include addition and/or removal of purge gas to the flow of the solid/gas mixture in the purge bin 102 (FIGS. 1-3) from the insert assembly 400. As illustrated, insert gas inlet 414 may transport purge gas to an area directly below the uppermost inverted cone 402. The insert gas inlet 414 may transport purge gas to the chamber 408 in the uppermost inverted cone 402. Because there is fluid communication, the purge gas supplied into the uppermost inverted cone 402 flows into the chamber 410 in the middle inverted cone 404 and the chamber 412 in the lowest inverted cone 406.

The insert assembly 400 may include gaps, such as first gas supply gap 416 and second gas supply gap 418, in its exterior wall that allow purge gas to flow from the inert assembly 400 into the solid/gas mixture flow. The bottom of the lowest inverted cone 406 may also be open to allow gas to flow from chamber 412 into the sold/gas mixture flow. As illustrated, the first gas supply gap 416 may be formed between the uppermost inverted cone 416 and the middle inverted cone 404, and the second gas supply gas 418 may be formed between the middle inverted cone 404 and the lowest inverted cone 406. The first and second gas supply gaps 416, 418 may wrap completely around the circumference of the exterior wall of the insert assembly 400. Additionally, the first and second gas supply gaps 418 may be segmented. Purge gas introduced into the inset assembly 400 may flow through the first and second gas supply gaps 416, 418 114 and into solid/gas mixture flow.

Embodiments of the first and second gas supply gaps 416, 418 may be stacked. The first and second gas supply gaps 416, 418 are considered stacked because they are arranged one on top of another so that gas flowing there through is considered to add gas to, or remove gas from the same portion of the solid/gas mixture flow, as if only a single gap was used. The first and second gas supply gaps 416, 418 may supply the purge gas to the solid/gas mixture through inwardly extending skirts, such as first supply skirt 420 and second supply skirt 422. The first supply skirt 420 may wrap the middle inverted cone 404 and the second supply skirt 422 may wrap the lowest inverted cone 406. In some embodiments, the first and second supply skirts 420, 422 may be segmented, and the segmented skirt may be placed on different locations relative to the longitudinal axis of the insert assembly 400 or may be placed at the same position relative to the insert assembly 400. In the illustrated embodiment, the first gas supply skirt 420 may be formed by the portion of the middle inverted cone 404 extending into the uppermost inverted cone 402, and the second gas supply skirt 422 may be formed by the portion of the lowest inverted cone 406 extending into the middle inverted cone 404.

The opening in the lowest inverted cone 406 and the first and second gas supply gaps 416, 418 may provide an area for surge gas to be added to the solid/gas mixture flowing in the purge bin 102. The first and second supply gaps 416, 418 and the opening in the lowest inverted cone 406 may provide a surface interface 424 between the solid/gas mixture and the added/removed gas. Each of the inverted cone uppermost inverted cone 402, the middle inverted cone 404, and the lowest inverted cone 406 may include an angle of repose θ that determines the area of this surface interface 424, as will be explained in more detail below with respect to FIG. 5. The area of this surface interface 414 may also be defined by the width of the first and second supply gaps 416, 418, as well as the angle ρ of the first and second supply skirts 420, 422.

Figure 5:
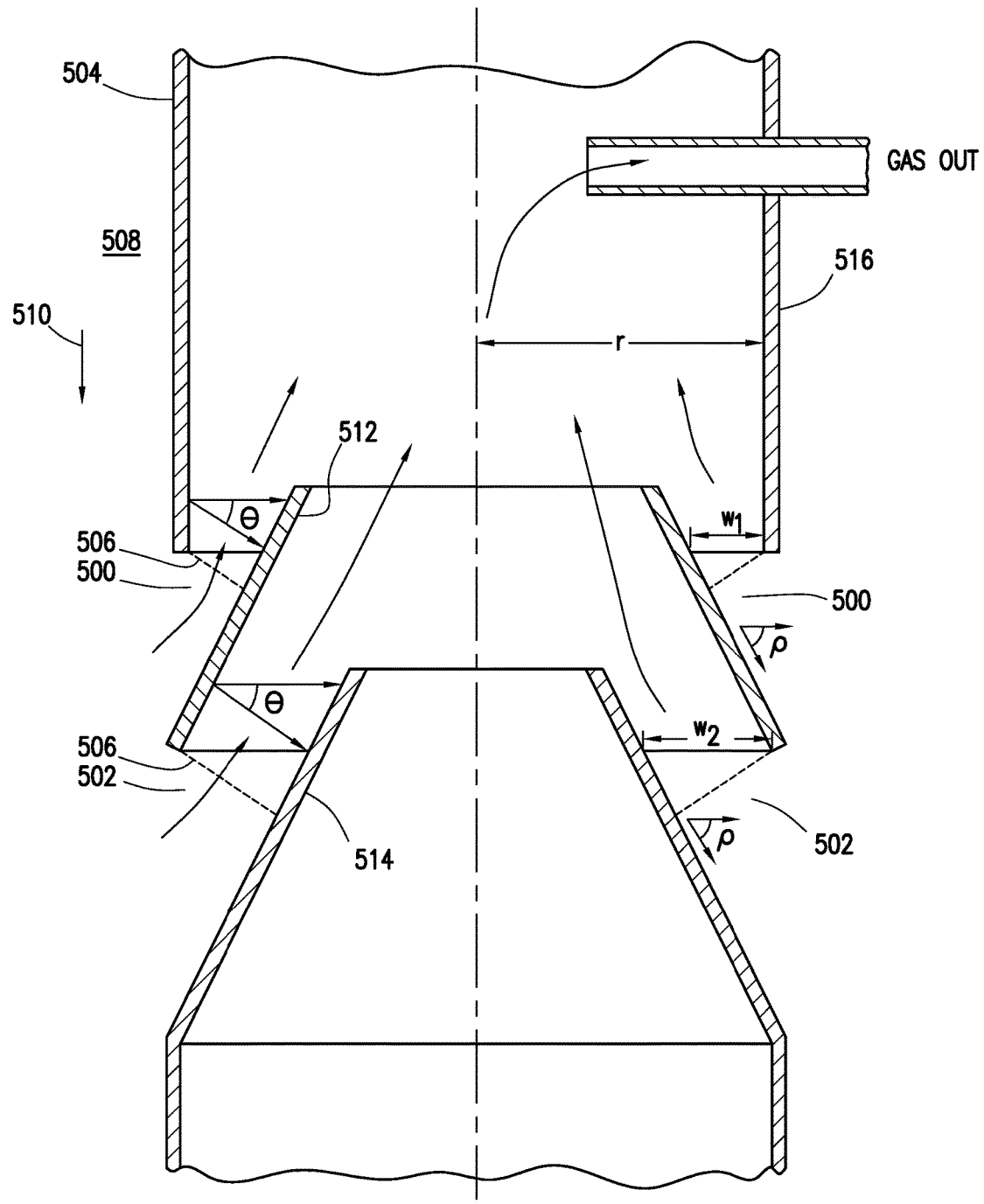
FIG. 5 is an exemplary cross-sectional diagram illustrating notches in an insert assembly for adding and/or removing gas from a solid/gas mixture.

With reference now to FIG. 5, a more detailed cross-section of example stacked gaps is shown according to some embodiments. Gas generally may flow in and/or out of the upper gap 500 and the lower gap 502 in the outer wall 516 of the insert assembly 504, such that gas may be added to and/or removed from the purge bin 102 (FIGS. 1-3), allowing contact with a surface interface 506 between the resin 508 and the added/removed gas. The resin 508 may be considered a solid/gas mixture as the resin 508 may comprise dissolved and/or interstitial gas, for example. The direction of flow of the resin 508 is indicated on FIG. 5 by arrow 510. Skirts 512, 514 that are inwardly facing may be formed on the insert assembly 504.

The upper gap 500 and lower gap 502 may each individually have width, shown on FIG. 5 as width w1 for the upper gap 500 and width w2 for the lower gap 502. The width w1 for the upper gap 500 may be defined as the distance between the skirt 512 and outer wall of the insert assembly 504 of the insert assembly 506. The width w2 for the lower gap may be defined as the distance between the skirt 512 and the skirt 514. The widths w1, w2 may individually be from about 0 to about r, wherein r is the radius of the insert assembly 516. In other embodiments, the widths w1, w2 may individually be from about r/2 to about r/5, wherein r is the radius of the insert assembly 516.

The angle ρ of the skirts 512, 514 may be about 70°±15° from perpendicular to the outer wall 516 of the insert assembly 504. The angle ρ of the skirt 404 may be about 70°±10°, or 70°±5°, from perpendicular to the insert wall 516. (o to r, r/2 to r/5)

The angle of repose θ, the angle ρ of the skirts 512, 514, and the widths w1, w2 of the upper and lower gaps 500, 502 determine the area of this surface interface 506 between the resin 508 and gas or gases. The area of this surface interface 506 may be chosen so as not to fluidize the solid/gas mixture 508 as gas is added and/or removed. If the resin 508 becomes fluidized, bubbles may form which may rise to the surface, an unwanted result.

A method for purging a gas from a solid/gas mixture may be implemented in the context of the functionality and architecture of any one of FIGS. 1-5. Of course, however, the method may be carried out in any desired environment.

Only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

Although the present invention and its advantages have been described in detail, it should be understood that various changes, substitutions and alterations may be made herein without departing from the spirit and scope of the invention as defined by the appended claims.

What is claimed is:
1. A system, comprising:
   a barrier; and an insert assembly in the barrier defining an annulus between the insert assembly and the barrier, wherein the insert assembly defines stacked flow gaps for addition and/or removal of gas from a solid/gas mixture flowing in the annulus, and wherein the insert assembly comprises a series of stacked inverted cones including a first inverted cone and a second inverted cone defining an internal chamber, wherein the insert assembly comprises a member under the first inverted cone, and wherein the member comprises: an uppermost member section having a tapered portion extending into the first inverted cone; a middle member section extending into a lower portion of the uppermost member section; and a lowest member section having a tapered portion extending into a lower portion of the middle member section.

2. The system as recited in claim 1, wherein the insert assembly causes the solid/gas mixture flowing in the annulus to have about a constant velocity profile there across.

3. The system as recited in claim 1, wherein the middle member section is tapered from bottom to top.

4. The system as recited in claim 1, wherein a chamber in the uppermost middle section is not in fluid communication with a chamber in the first inverted cone, and wherein a chamber in the middle member section is in fluid communication with the chamber in the uppermost middle section.

5. The system as recited in claim 1, further comprising a gas inlet for transporting a purge gas to an area below the first inverted cone; and a gas outlet for transporting a gas from an area in the uppermost member section.

6. The system as recited in claim 1, further comprising a skirt extending inwardly from the insert assembly for each of the stacked gaps.

7. The system as recited in claim 1, further comprising a skirt extending outwardly from the insert assembly for each of the stacked gaps.

8. The system as recited in claim 1, wherein the stacked gaps have a vertical spacing from adjacent ones of the stacked gaps of about 12 inches or less.

9. The system as recited in claim 1, wherein the stacked gaps each have a width of from about r/2 to about r/5, wherein r is a radius of the insert assembly.

10. A method for purging a solid/gas mixture, comprising:
adding the solid/gas mixture to a barrier having an insert assembly therein, wherein the inset assembly defines stacked flow gaps, and wherein the insert assembly defines a series of stacked inverted cones including a first inverted cone and a second inverted cone defining an internal chamber, wherein the insert assembly comprises a member under the first inverted cone, and wherein the member comprises: an uppermost member section having a tapered portion extending into the first inverted cone; a middle member section extending into a lower portion of the uppermost member section; and a lowest member section having a tapered portion extending into a lower portion of the middle member section;
injecting a purge gas through the insert assembly and into the solid/gas mixture as the solid/gas mixture moves downward through the barrier; and
removing a gas from the solid/gas mixture through the insert assembly as the solid/gas mixture moves downward through the barrier.

11. The method as recited in claim 10, wherein the insert assembly causes the solid/gas mixture flowing in the barrier to have about a constant velocity profile there across.

12. The method as recited in claim 10, wherein the injecting the purge gas comprises injecting the purge gas into an area under an uppermost of the stacked inverted cones.

13. The method as recited in claim 11, wherein the injecting the purge gas comprises injecting the purge gas into an area under the first inverted cone.

14. The method as recited in claim 13, wherein the removing the gas comprises removing gas from an uppermost section of the member, wherein a tapered portion of the uppermost section extends into the first inverted cone.

15. The method as recited in claim 13, wherein the removing the gas comprises flowing the gas through the stacked flow gaps, the stacked flow gaps being formed between sections of the member.

16. The method as recited in claim 10, wherein the removing the gas comprising flowing the gas through skirts extending inwardly from the insert assembly.

17. The method as recited in claim 10, wherein the stacked gaps have a vertical spacing about 12 inches or less, and wherein the stacked gaps each have a width of from about r/2 to about r/5, wherein r is a radius of the insert assembly.

* * * * *